United States Patent
Oga et al.

(10) Patent No.: US 11,947,408 B2
(45) Date of Patent: Apr. 2, 2024

(54) ANOMALY DETECTION METHOD, ANOMALY DETECTION RECORDING MEDIUM, ANOMALY DETECTION DEVICE, REWRITING METHOD, AND REWRITING DEVICE

(71) Applicant: Panasonic Intellectual Property Management Co., Ltd., Osaka (JP)

(72) Inventors: Kenji Oga, Osaka (JP); Norifumi Murata, Osaka (JP); Kyoko Ueda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 17/568,268

(22) Filed: Jan. 4, 2022

(65) Prior Publication Data
US 2022/0129339 A1  Apr. 28, 2022

Related U.S. Application Data

(63) Continuation of application No. PCT/JP2021/000423, filed on Jan. 8, 2021.

(30) Foreign Application Priority Data

Mar. 27, 2020 (JP) ................ 2020-058221

(51) Int. Cl.
*G06F 11/00* (2006.01)
*G06F 9/38* (2018.01)
(Continued)

(52) U.S. Cl.
CPC ........ *G06F 11/0745* (2013.01); *G06F 9/3836* (2013.01); *G06F 11/0721* (2013.01); *G06F 11/0751* (2013.01); *G06F 11/1048* (2013.01)

(58) Field of Classification Search
CPC .................. G06F 11/0745; G06F 11/0751
See application file for complete search history.

(56) References Cited

U.S. PATENT DOCUMENTS

| | | | | |
|---|---|---|---|---|
| 4,446,517 A | * | 5/1984 | Katsura | G06F 9/223 712/E9.01 |
| 2006/0041863 A1 | * | 2/2006 | Saito | G06F 21/566 717/124 |

(Continued)

FOREIGN PATENT DOCUMENTS

| | | |
|---|---|---|
| JP | S63-55644 | 3/1988 |
| JP | 03-268034 | 11/1991 |

(Continued)

OTHER PUBLICATIONS

Japanese Office Action dated Dec. 20, 2022 issued in Japanese patent application No. 2020-058221 along with an English translation thereof.

(Continued)

*Primary Examiner* — Joshua P Lottich
(74) *Attorney, Agent, or Firm* — GREENBLUM & BERNSTEIN, P.L.C.

(57) ABSTRACT

An anomaly detection method includes: reading a branch target address corresponding to a branch instruction, twice or more; determining whether the branch target addresses read are identical; and executing the branch instruction when the branch target addresses read are identical, and executing anomaly detection processing when the branch target addresses read are not identical.

10 Claims, 9 Drawing Sheets

(51) Int. Cl.
*G06F 11/07* (2006.01)
*G06F 11/10* (2006.01)

(56) References Cited

U.S. PATENT DOCUMENTS

| | | | | |
|---|---|---|---|---|
| 2013/0152048 A1* | 6/2013 | Sato | ................... | G06F 11/2236 |
| | | | | 717/124 |
| 2014/0108862 A1* | 4/2014 | Rafacz | ................. | G06F 9/3842 |
| | | | | 712/225 |
| 2018/0032340 A1* | 2/2018 | Ibing | ................... | G06F 11/0751 |

FOREIGN PATENT DOCUMENTS

| | | |
|---|---|---|
| JP | 04-364531 | 12/1992 |
| JP | H05-64933 | 8/1993 |
| JP | 3169879 | 8/1999 |
| JP | 2000-172532 | 6/2000 |
| JP | 2011-154459 | 8/2011 |
| JP | 6424633 | 7/2016 |
| JP | 2017-123119 | 7/2017 |

OTHER PUBLICATIONS

Japanese Office Action dated Apr. 11, 2023 issued in Japanese Patent Application No. 2020-058221 along with a corresponding English translation.
International Search Report issued in International Pat. Appl. No. PCT/JP2021/000423, dated Mar. 30, 2021, along with an English translation thereof.

* cited by examiner

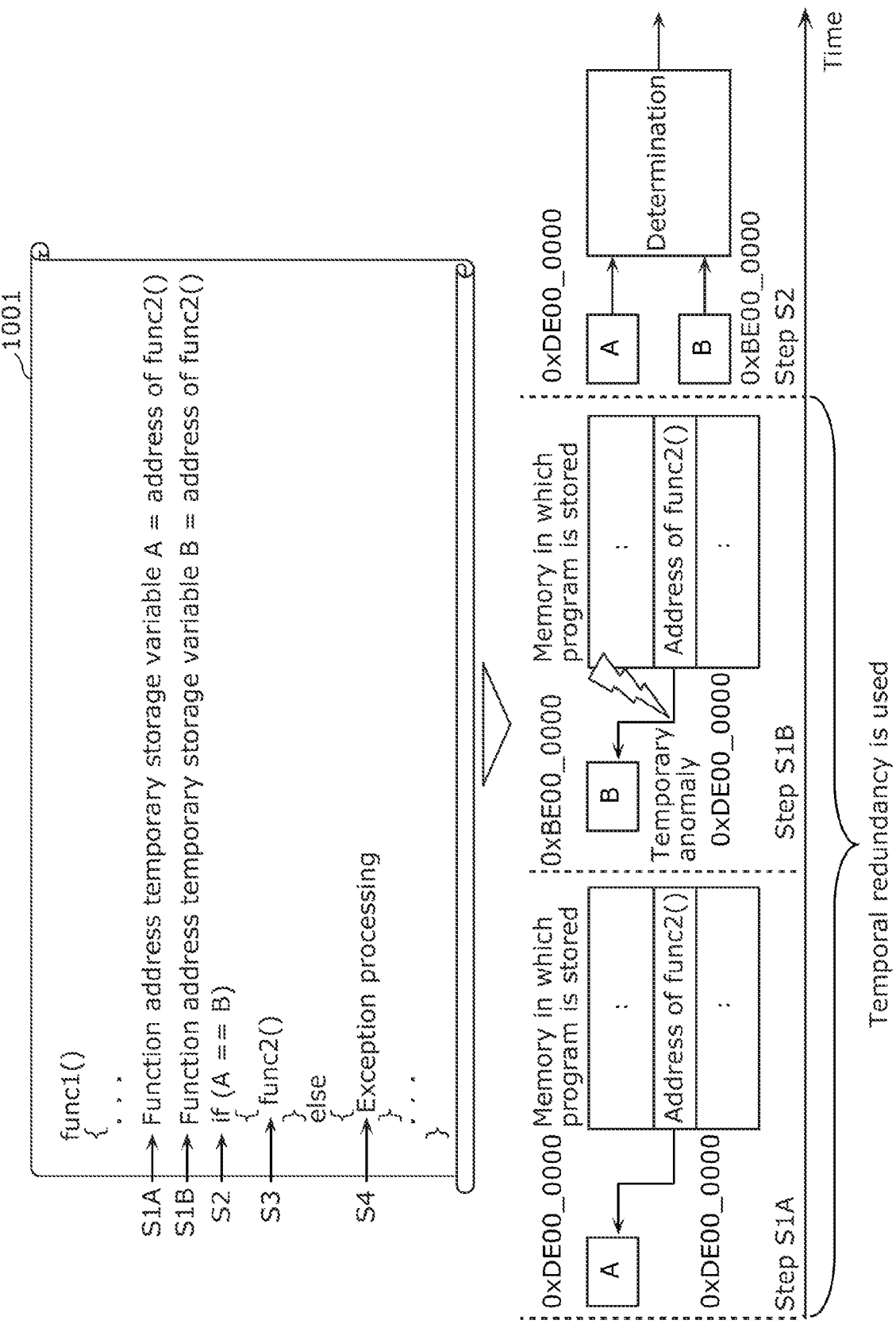

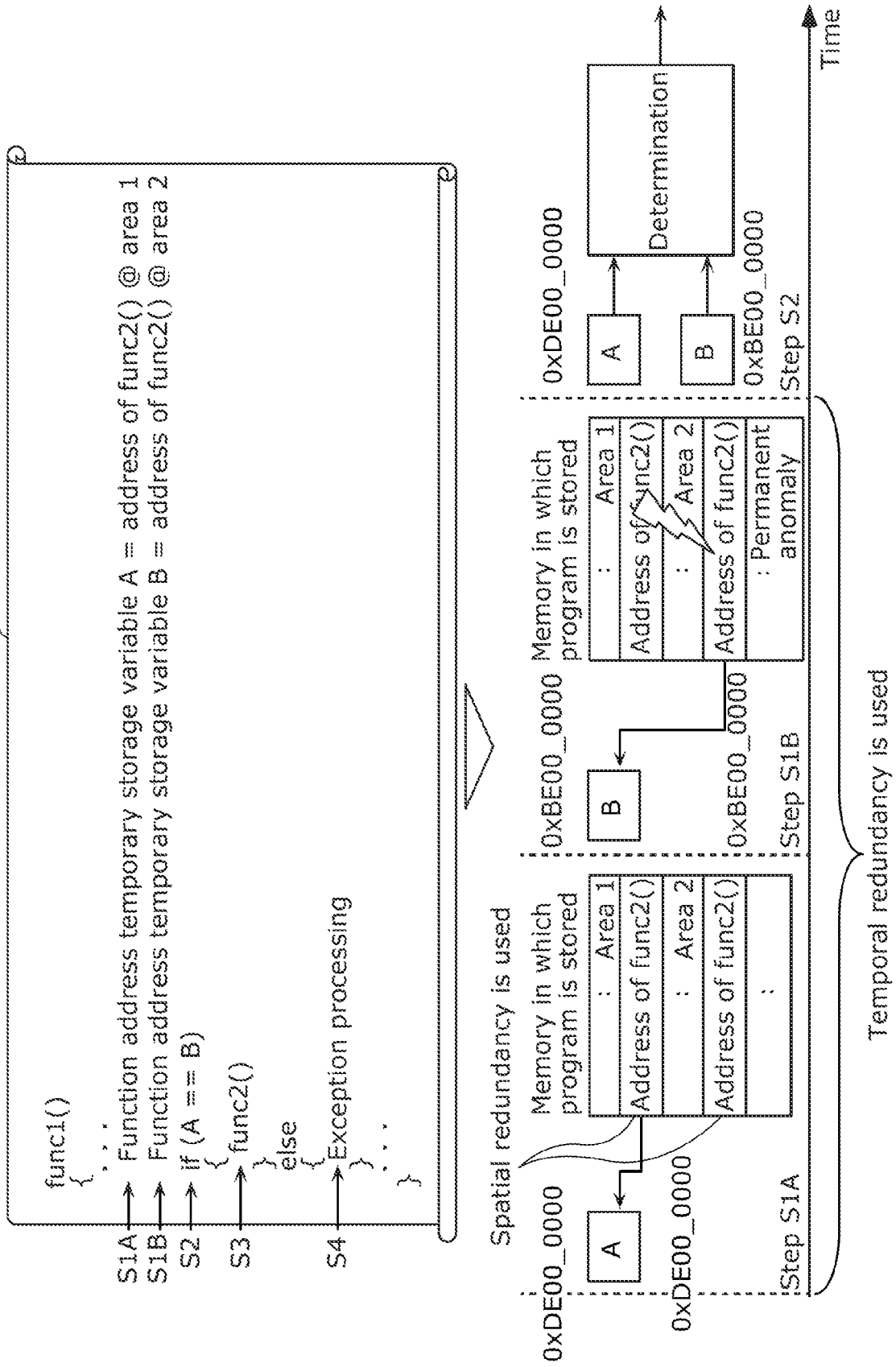

ANOMALY DETECTION METHOD, ANOMALY DETECTION RECORDING MEDIUM, ANOMALY DETECTION DEVICE, REWRITING METHOD, AND REWRITING DEVICE

CROSS REFERENCE TO RELATED APPLICATIONS

This is a continuation application of PCT International Application No. PCT/JP2021/000423 filed on Jan. 8, 2021, designating the United States of America, which is based on and claims priority of Japanese Patent Application No. 2020-058221 filed on Mar. 27, 2020.

FIELD

The present disclosure relates to an anomaly detection method, an anomaly detection recording medium, an anomaly detection device, a rewriting method, and a rewriting device.

BACKGROUND

Devices that multiplex a stack for saving a return address at the operation of a function call or the occurrence of an interruption function have been conventionally disclosed (Patent Literature (PTL) 1, for example). Such devices can detect an anomaly at the time when functions return.

CITATION LIST

Patent Literature

PTL 1: Japanese Unexamined Patent Application Publication No. 2017-123119

SUMMARY

However, the technique disclosed in Patent Literature 1 above can be improved upon.

In view of the above, according to the present disclosure, an anomaly detection method and so on capable of improving upon the above related art are provided.

An anomaly detection method according to an aspect of the present disclosure includes: reading a branch target address corresponding to a branch instruction, twice or more; determining whether the branch target addresses read are identical; and executing the branch instruction when the branch target addresses read are identical, and executing anomaly detection processing when the branch target addresses read are not identical.

A recording medium according to an aspect of the present disclosure is a non-transitory computer-readable recording medium having recorded thereon a program for causing a computer to execute the anomaly detection method.

An anomaly detection device according to an aspect of the present disclosure includes: a detector that detects a branch instruction in a program; a reader that reads a branch target address corresponding to the branch instruction, twice or more; a determiner that determines whether the branch target addresses read are identical; and an executer that executes the branch instruction when the branch target addresses read are identical, and executes anomaly detection processing when the branch target addresses read are not identical.

A rewriting method according to an aspect of the present disclosure is a method of rewriting a program, which includes: detecting a branch instruction in the program; and rewriting the branch instruction detected into an anomaly detection instruction. The anomaly detection instruction includes instructions for: reading a branch target address corresponding to the branch instruction, twice or more; determining whether the branch target addresses read are identical; and executing the branch instruction when the branch target addresses read are identical, and executing anomaly detection processing when the branch target addresses read are not identical.

A recording medium according to an aspect of the present disclosure is a non-transitory computer-readable recording medium having recorded thereon a program for causing a computer to execute the method described above.

A rewriting device according to an aspect of the present disclosure is a device that rewrites a program, and the device includes: a detector that detects a branch instruction in the program; and a rewriter that rewrites the branch instruction detected to an anomaly detection instruction. The anomaly detection instruction includes instructions for: reading a branch target address corresponding to the branch instruction, twice or more; determining whether the branch target addresses read are identical; and executing the branch instruction when the branch target addresses read are identical, and executing anomaly detection processing when the branch target addresses read are not identical.

It should be noted that these comprehensive or specific aspects may be embodied by a system, a method, an integrated circuit, a computer program, a computer-readable recording medium such as a CD-ROM, or any combination of the system, the method, the integrated circuit, the computer program, and the recording medium. The recording medium may be a non-transitory recording medium.

In an anomaly detection method and the like according to an aspect of the present disclosure, anomaly at the branch of a function can be detected.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 2B shows an example of an anomaly detection program according to Embodiment 1, and a condition when a temporary anomaly occurs.

FIG. 3B shows another example of the anomaly detection program according to the Embodiment 1, and a condition when a permanent anomaly occurs.

DESCRIPTION OF EMBODIMENTS

Figure 1:
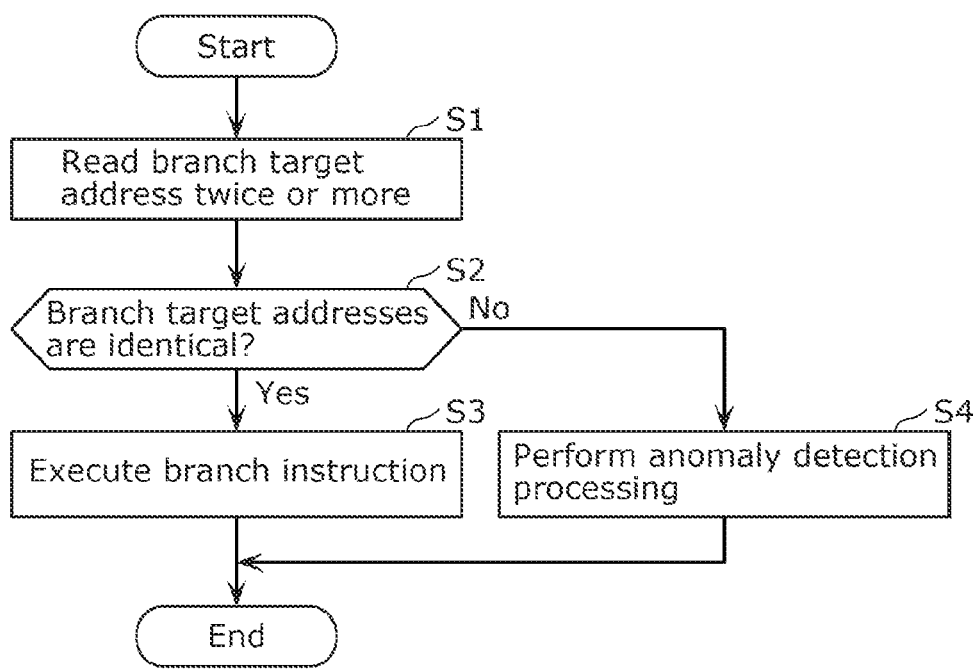
FIG. 1 is a flowchart showing an example of an anomaly detection method according to Embodiment 1.

According to PTL 1 above, an anomaly at the return of the function can be detected. However, there is no disclosure regarding the detection of the anomaly at branch of a function.

In view of this, in the present disclosure, an anomaly detection method and so on in which an anomaly at the branch of a function can be detected is described.

An anomaly detection method according to an aspect of the present disclosure includes: reading a branch target address corresponding to a branch instruction, twice or more; determining whether the branch target addresses read are identical; and executing the branch instruction when the branch target addresses read are identical, and executing anomaly detection processing when the branch target addresses read are not identical.

According to the above method, the branch target address corresponding to the branch instruction is read twice or more before being substituted in a program counter (PC). The branch instruction is executed only when the read branch target addresses are identical (i.e., the branch target address is substituted in the PC). When the branch target addresses are not identical, the anomaly detection processing is performed. Therefore, anomaly at the function branch can be detected.

For example, the branch target address may be retained in a single memory area, and the reading may include reading the branch target address from the single memory area, twice or more.

According to this configuration, the reading of the branch target address from a single memory area is performed twice or more at a time interval. Such temporal redundancy is used to enable the detection of a temporary anomaly including invert of a bit status, which is induced by a cosmic radiation. Furthermore, a single memory area is used to thereby preventing a memory usage from increasing.

For example, the branch target addresses may be respectively retained in different memory areas, and the reading may include reading the branch target addresses respectively from the different memory areas, twice or more.

According to this configuration, the reading of the branch target addresses from the different memory areas is performed twice or more at a time interval. Such spatial redundancy is used to enable the detection of a permanent anomaly, such as an anomaly due to production tolerance, aging degradation, or the like. In addition, the branch target addresses are read from different memory areas twice or more at a time interval. Such temporal redundancy is also used to enable the detection of not only the permanent anomaly but also the temporary anomaly.

For example, in the anomaly detection method, the reading may be performed when a specified condition is satisfied, and the reading may not be performed when the specified condition is not satisfied.

If the branch target addresses respectively corresponding to all the branch instructions contained in a program are read twice or more, and the processing of the anomaly detection is performed, the processing load increases. In contrast, a branch target address is read only when the specified condition is satisfied, thereby preventing the processing load from increasing.

An anomaly detection program according to an aspect of the present disclosure is a program for causing a computer to execute the anomaly detection method described above.

According to the configuration, an anomaly detection program that can detect an anomaly at the branch of a function can be provided.

An anomaly detection device according to an aspect of the present disclosure includes: a detector that detects a branch instruction in a program; a reader that reads a branch target address corresponding to the branch instruction, twice or more; a determiner that determines whether the branch target addresses read are identical; and an executer that executes the branch instruction when the branch target addresses read are identical, and executes anomaly detection processing when the branch target addresses read are not identical.

According to the configuration, an anomaly detection device that can detect an anomaly at the branch of a function can be provided.

A rewriting method according to an aspect of the present disclosure is a method of rewriting a program, which includes: detecting a branch instruction in the program; and rewriting the branch instruction detected into an anomaly detection instruction. The anomaly detection instruction includes instructions for: reading a branch target address corresponding to the branch instruction, twice or more; determining whether the branch target addresses read are identical; and executing the branch instruction when the branch target addresses read are identical, and executing anomaly detection processing when the branch target addresses read are not identical.

According to the configuration, the rewriting method through which an existing program can be rewritten to an anomaly detection program capable of detecting an anomaly at the branch of a function can be provided.

For example, in the rewriting method, the rewriting may be performed when a specified condition is satisfied, and the rewriting may not be performed when the specified condition is not satisfied.

If the rewriting processing is performed to all the branch instructions present in a program, the processing load increases. In contrast, the rewriting processing is performed only when the specified condition is satisfied, thereby preventing the processing load from increasing.

A rewriting program according to an aspect of the present disclosure is a program for causing a computer to execute the method described above.

According to the configuration, the rewriting program through which an existing program can be rewritten to an anomaly detection program capable of detecting an anomaly at the branch of a function can be provided.

A rewriting device according to an aspect of the present disclosure is a device that rewrites a program, and the device includes: a detector that detects a branch instruction in the program; and a rewriter that rewrites the branch instruction detected into an anomaly detection instruction. The anomaly detection instruction includes instructions for: reading a branch target address corresponding to the branch instruction, twice or more; determining whether the branch target addresses read are identical; and executing the branch instruction when the branch target addresses read are identical, and executing anomaly detection processing when the branch target addresses read are not identical.

According to the configuration, the rewriting device that can rewrite an existing program to an anomaly detection program capable of detecting an anomaly at the branch of a function can be provided.

Hereinafter, embodiments are specifically described, with reference to the drawings.

The below-described embodiments each show comprehensive or specific examples. Numeral values, shapes, materials, structural components, arrangement positions and connection of the structural components, steps, the order of the steps are examples, and do not intend to limit the present disclosure.

Embodiment 1

Embodiment 1 is described, with reference to FIGS. 1 to 4. In Embodiment 1, the description is given to an anomaly detection method through which an anomaly at the branch of a function can be detected, an anomaly detection program for causing a computer to execute the anomaly detection method, and an anomaly detection device.

The anomaly detection method detects an anomaly that may occur when a branch instruction (function call instruction) in a program is executed. The branch instruction in a program is executed by substituting, into a PC, a branch target address (for example, the value of a function pointer) in which an instruction code of a jump target function is stored. At this time, the jump target address that is the branch target address may be rewritten due to some factor. For example, if the rewritten address indicates an inaccessible memory area, it is possible to detect an anomaly as Abort exception. Alternatively, if the rewritten address indicates an accessible area, but is an invalidation instruction (e.g., out of a code area), it is possible to detect an anomaly as an invalidation instruction exception. However, if the rewritten address indicates a code area, exception processing cannot be performed or is delayed. This may cause a program to go out of control. For example, if a function at the wrong jump target is completed, a correct restore address is not saved in the stack. The wrong restore address is popped from the stack, causing the PC to have an unexpected value, again. Such an unexpected operation by a program of an on-vehicle product, for example, may lead a traffic accident and so on. Therefore, such an anomaly should be detected.

FIG. 1 is a flowchart showing an example of an anomaly detection method according to Embodiment 1.

First, processing of reading the branch target address corresponding to the branch instruction twice or more is performed (Step S1). In the reading processing, for example, the branch target address may be read from a single memory area twice or more, and the branch target addresses may be read from different memory areas, respectively, twice or more.

Then, processing of determining whether the read branch target addresses are identical to each other is performed (Step S2). For example, the read branch target addresses are respectively stored in different resistors, and it is determined whether the respective branch target addresses stored in the different resistors are identical to each other.

If the read branch target addresses are identical to each other (Yes in Step S2), processing of executing the branch instruction is performed (Step S3). For example, if the read branch target addresses are identical, the branch target address is substituted in the PC, thereby executing the branch instruction.

If the read branch target addresses are not identical (No in Step S2), processing of executing the anomaly detection is performed (Step S4). The anomaly detection processing corresponds, for example, to exception processing. For example, if the read branch target addresses are not identical, an address corresponding to an exception processing instruction is substituted in the PC, thereby performing the anomaly detection processing.

As described above, the branch target address corresponding to the branch instruction is read twice or more before being substituted in the PC, and the branch instruction is executed (i.e., the branch target address is substituted in the PC) only when the respective read branch target addresses are identical. If the read branch target addresses are not identical, the anomaly detection processing is performed. Therefore, an anomaly at the branch of a function can be detected.

For example, steps in the anomaly detection method can be executed by a computer (a computer system). The present disclosure can be embodied as an anomaly detection program for causing a computer to execute the steps included in the anomaly detection method. Furthermore, the present disclosure can be embodied as a non-transitory computer readable recording medium, such as a CD-ROM, in which the anomaly detection program is recorded.

If the present disclosure is embodied by the anomaly detection program (software), for example, the anomaly detection program is executed using hardware resources including a CPU, a memory, an input-output circuit, and so on in a computer, thereby executing each of the steps included in the anomaly detection method. In other words, the CPU obtains data from the memory or the input-output circuit and performs calculation, so as to output results of the calculation to the memory, the input output circuit, or other units, thereby executing each of the steps.

Specific examples of the anomaly detection method and the anomaly detection program are described with reference to FIGS. 2A to 3B. The anomaly detection program may be embodied by a low-level programming language, such as an assembly language, or by a high-level programming language, such as the C language.

Figure 2A:
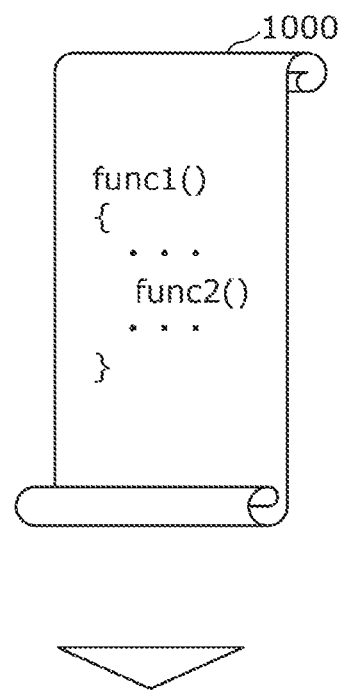
FIG. 2A shows an example of a program according to a comparative example, and a condition when a temporary anomaly occurs.
Figure 2A:
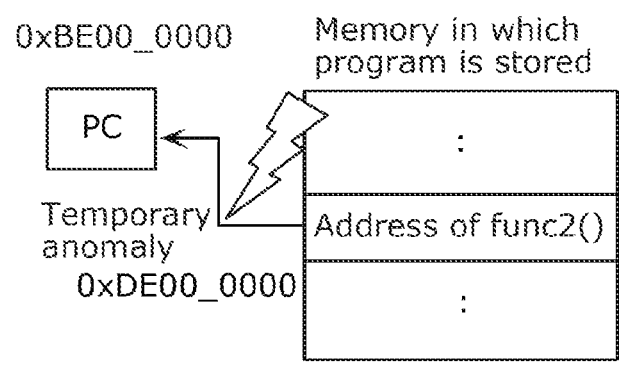

FIG. 2A shows an example of a program according to a comparative example, and a condition when a temporary anomaly occurs.

FIG. 2A shows, in the upper side thereof, program 1000 according to the comparative example, and shows, in the lower side thereof, a condition when the temporary anomaly occurs upon execution of program 1000.

Program 1000 contains function func1( ) and function func2( ), and is schematically expressed by a source code, for example. Function func1( ) and function func2( ) each are branch instructions. Herein, function func2( ) is focused.

As shown in the lower part of FIG. 2A, a branch target address (e.g., 0xDE00_0000) corresponding to function func2( ) retained in the memory in which program 1000 is stored is substituted in the PC, to thereby execute function func2( ). Here, when the branch target address is substituted in the PC, a temporary anomaly, such as invert of a bit status induced by cosmic radiation, may occur. In such a case, the branch target address rewritten by the temporary anomaly (e.g., 0xBE00_0000) is substituted in the PC, which may cause the program to go out of control.

FIG. 2B shows an example of an anomaly detection program according to Embodiment 1, and a condition when the temporary anomaly occurs.

FIG. 2B shows, in the upper side thereof, anomaly detection program 1001 according to Embodiment 1, and shows, in the lower side thereof, a condition when the temporary anomaly occurs upon execution of anomaly detection program 1001.

For example, the branch target address corresponding to function func2( ) is retained in a single memory area, and the branch target address corresponding to function func2( ) is read twice or more from the single memory area in anomaly detection program 1001. As shown in FIG. 2B, for example, the branch target address corresponding to function func2( ) is read from a single memory area, and is stored in function-address temporary storage variable A (e.g., register A) (Step S1A), and the branch target address corresponding to function func2( ) is again read from the single memory area and is stored in function-address temporary storage variable B (e.g., resister B) (Step S1B). Step S1A and Step S1B here correspond to Step S1 in the anomaly detection method shown in FIG. 1. It should be noted that an interval between time points at which the branch target address is read is appropriately determined according to the performance of a computer that executes anomaly detection program 1001, and so on.

As shown in the lower side of FIG. 2B, no temporary anomaly occurs and the correct branch target address (e.g., 0XDE00_0000) is stored in resister A in the primary reading of the branch target address in Step S1A. Furthermore, a temporary anomaly occurs and the branch target address rewritten due to the temporary anomaly (e.g., 0xBE00_0000) is stored in resister B in the secondary reading of the branch target address, in Step S1B.

Then, it is determined, in anomaly detection program 1001, whether the branch target addresses that have been read are identical (Step S2). Step S2 here corresponds to Step S2 in the anomaly detection method shown in FIG. 1.

As shown in the lower side of FIG. 2B, in the determination in Step S2, it is determined whether the branch target address stored in resister A and the branch target address stored in resister B are identical to each other.

In anomaly detection program 1001, if the branch target addresses that have been read are identical, function func2( ) is executed (Step S3). In other words, the branch target address corresponding to function func2( ) is substituted in the PC. Step S3 here corresponds to Step S3 in the anomaly detection method shown in FIG. 1.

In anomaly detection program 1001, if the branch target addresses that have been read are not identical, exception processing is executed as the anomaly detection processing, for example. In other words, an address corresponding to the exception processing instruction is substituted in the PC. Step S4 here corresponds to Step S4 in the anomaly detection method shown in FIG. 1.

As described above, the reading of the branch target address is performed twice or more at a time interval from a single memory area. Such temporal redundancy is used to enable the detect the temporary anomaly, such as invert of a bit status, which is induced by a cosmic radiation.

Figure 3A:
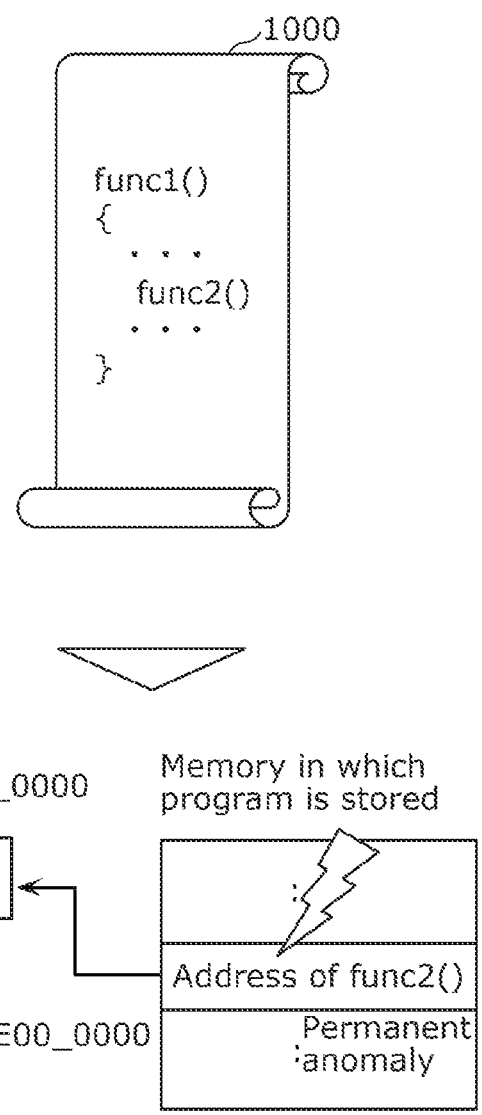
FIG. 3A shows an example of a program according to the comparative example, and a condition when a permanent anomaly occurs.

FIG. 3A shows an example of a program according to the comparative example, and a condition when a permanent anomaly occurs.

FIG. 3A shows, in the upper side thereof, program 1000 according to the comparative example, and shows, in the lower side thereof, a condition when the permanent anomaly occurs upon execution of program 1000.

Program 1000 is same as the program described with reference to FIG. 2A, and thus the description of program 1000 is omitted.

As shown in the lower side of FIG. 3A, a branch target address (e.g., 0xDE00_0000) corresponding to function func2( ) retained in the memory in which program 1000 is stored is substituted in the PC, to thereby executing function func2( ). Here, if the permanent anomaly including an anomaly in a memory due to production tolerance or aging degradation occurs, the branch target address retained in the memory may be rewritten. If the branch target address rewritten due to such a permanent anomaly (e.g., 0xBE00_0000) is substituted in the PC, a program may go out of control.

FIG. 3B shows another example of the anomaly detection program according to Embodiment 1, and a condition when a permanent anomaly occurs.

FIG. 3B shows, in the upper side thereof, anomaly detection program 1002 according to Embodiment 1, and shows, in the lower side thereof, a condition when the permanent anomaly occurs upon execution of anomaly detection program 1002.

For example, branch target addresses corresponding to function func2( ) are retained in different memory areas, and the reading of the branch target addresses corresponding to function func2( ) from the different memory areas is performed twice or more. As shown in FIG. 3B, for example, a branch target address corresponding to function func2( ) is read from memory area 1, and is stored in function-address temporary storage variable A (e.g., register A) (Step S1A), and a branch target address corresponding to function func2( ) is read from memory area 2 and is stored in function-address temporary storage variable B (e.g., resister B) (Step S1B). Step S1A and Step S1B here correspond to Step S1 in the anomaly detection method shown in FIG. 1.

As shown in the lower side of FIG. 3B, no permanent anomaly occurs in memory area 1 in the reading of the branch target address from memory area 1 in Step S1A, and the correct branch target address (e.g., 0XDE00_0000) is stored in resister A. In the reading of the branch target address from memory area 2 in Step S1B, a permanent anomaly occurs in memory area 2, and the branch target address rewritten due to the permanent anomaly (e.g., 0xBE00_0000) is stored in resister B.

Subsequently, it is determined whether the branch target addresses that have been read are identical in anomaly detection program 1002 (Step S2). Step S2 here corresponds to Step S2 in the anomaly detection method shown in FIG. 1.

As shown in the lower side of FIG. 3B, in the determination in Step S2, it is determined as to whether the branch target address stored in resister A and the branch target address stored in resister B are identical to each other.

In anomaly detection program 1002, if the branch target addresses that have been read are identical, function func2( ) is executed (Step S3). In other words, the branch target address corresponding to function func2( ) is substituted in the PC. Step S3 here corresponds to Step S3 in the anomaly detection method shown in FIG. 1.

In anomaly detection program 1002, if the branch target addresses that have been read are not identical, exception processing is executed as the anomaly detection processing. In other words, an address corresponding to the exception processing instruction is substituted in the PC. Step S4 here corresponds to Step S4 in the anomaly detection method shown in FIG. 1.

As described above, the reading of the branch target addresses from the different memory areas is performed twice or more. Such spatial redundancy is used to enable the detection of the permanent anomaly, such as an anomaly due to production tolerance, aging degradation, or the like. In addition, the reading of the branch target addresses from different memory areas is performed twice or more at a time interval. Such temporal redundancy is also used to enable the detection of not only the permanent anomaly but also the temporary anomaly.

It should be noted that a program may contain a lot of branch instructions. If the branch target addresses respectively corresponding to all the branch instructions contained in a program are read twice or more and the processing for the anomaly detection is performed, the processing load increases. In view of this situation, in the anomaly detection method, when a specified condition is satisfied, the reading may be performed, whereas when the specified condition is not satisfied, the reading may not be performed. Examples of the specified condition include: when the branch target address corresponding to the branch instruction is read twice or more, an additionally-needed memory capacity, processing time, or the like is equal to or lower than a certain level. Furthermore, the branch instructions may be prioritized according to frequencies of the execution in the program. In addition, in the specific condition, the order of the priority of the branch instruction corresponding to the branch target address to be read may be equal to or higher than a certain level. As described above, the branch target address is read only when the specified condition is satisfied, so that the increase in processing load can be prevented.

The present disclosure can be embodied as an anomaly detection device that can detect an anomaly at the branch of a function, for example.

Figure 4:
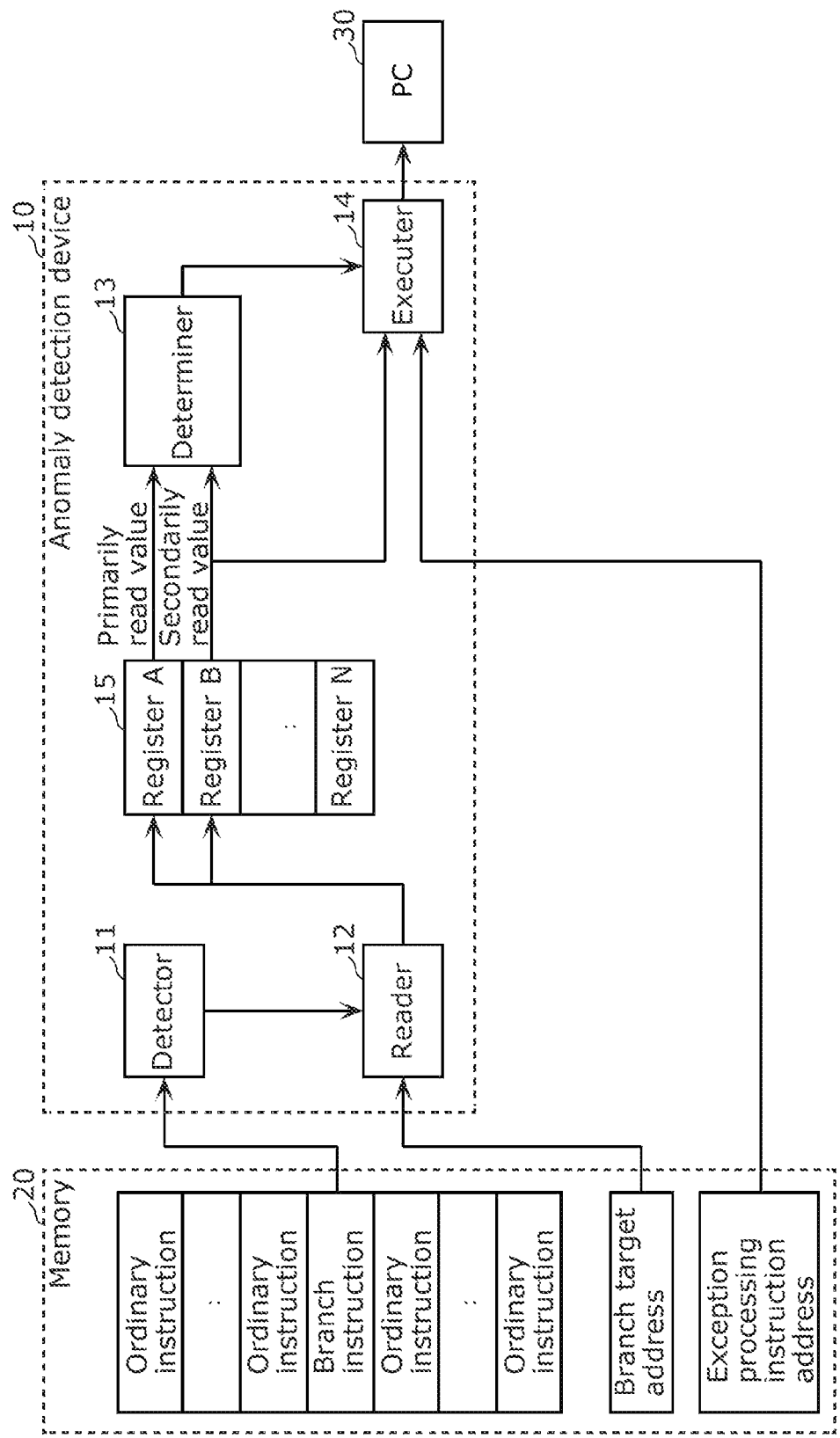
FIG. 4 is a block diagram showing an example of an anomaly detection device according to Embodiment 1.

FIG. 4 is a block diagram showing an example of anomaly detection device 10 according to Embodiment 1. FIG. 4 also shows memory 20 and PC 30, in addition to anomaly detection device 10. In memory 20, a program including branch instructions, addresses corresponding to various instructions, and so on are retained. Memory 20 and PC 30 may be included in anomaly detection device 10. The program including branch instructions, the addresses corresponding to various instructions may be retained in a single memory 20 or may be separately retained in a plurality of memories.

Anomaly detection device 10 is a computer including a processor, a memory, and so on. The memory can store a control program to be executed by the processor. Anomaly detection 10 includes detector 11, reader 12, determiner 13, executer 14, and storage circuit 15. Detector 11, reader 12, determiner 13, and executer 14 are embodied by the processor or the like, which executes the control program stored in the memory.

Detector 11 detects a branch instruction in a program stored in memory 20.

Reader 12 performs the reading twice or more on a branch target address corresponding to the branch instruction detected by detector 11. For example, reader 12 performs reading of the branch target address twice. The primarily read branch target address is stored in register A in storage circuit 15, and the secondarily read branch target address is stored in resistor B in storage circuit 15. It is exemplified here that the branch target address corresponding to a certain branch instruction is retained in a single memory area, and reader 12 performs the reading of the branch target address from the single memory area twice or more. Here, the branch target addresses corresponding to a certain branch instruction may be retained in different memory areas, and reader 12 may perform the reading of the branch target address from the different memory areas twice or more.

Determiner 13 determines whether the branch target addresses that have been read are identical. For example, determiner 13 determines whether the primarily read branch target address stored in register A is identical to the secondarily read branch target address stored in resistor B.

If the branch target addresses that have been read are identical, executer 14 executes the branch instruction, whereas if the branch target addresses that have been read are not identical, executer 14 executes the anomaly detection processing. If the read branch target addresses are identical, executer 14 executes the branch instruction by substituting, into the PC 30, the branch target address stored in resister B as the branch target address corresponding to the branch instruction, for example. Here, if the read branch target addresses are identical, executer 14 may execute the branch instruction by substituting, into the PC30, the branch target address stored in resister A as the branch target address corresponding to the branch instruction. If the read branch target addresses are not identical, executer 14 executes the anomaly detection processing by substituting, into the PC 30, an address corresponding to the exception instruction, for example.

If the specified condition described above is satisfied, detector 11 may detect a branch instruction in the program stored in memory 20, and reader 12 may perform the reading of the branch target address corresponding to the detected branch instruction twice or more.

Accordingly, the present disclosure can be embodied as anomaly detection device 10 (hardware) that can detect an anomaly at the branch of a function. This can reduce a memory resource in comparison with a format that uses software.

Embodiment 2

Embodiment 2 is described with reference to FIGS. 5 to 7. In Embodiment 2, the description is given to a rewriting method, a rewriting program, and a rewriting device, by which an existing program can be rewritten into an anomaly detection program that can detect an anomaly at the branch of a function.

Figure 5:
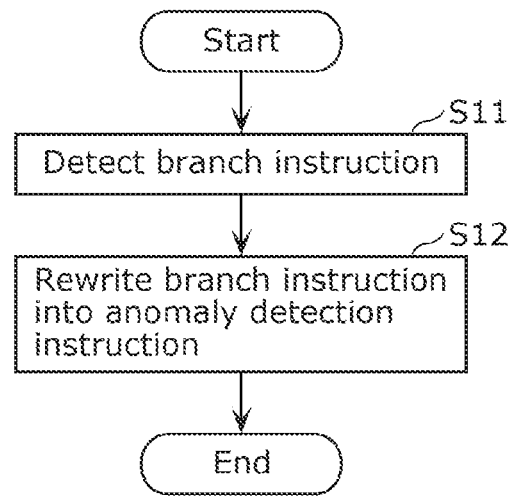
FIG. 5 is a flowchart showing an example of a rewriting method according to Embodiment 2.

FIG. 5 is a flowchart showing an example of the rewriting method according to Embodiment 2.

First, processing of detecting a branch instruction in a program is performed (Step S11). As described in Embodiment 1, a part of the branch instruction(s) among a plurality of branch instructions contained in a program may be detected for preventing the processing load from increasing.

Then, processing of rewriting the branch instruction that has been detected to an anomaly detection instruction is performed (Step S12). According to the anomaly detection instruction, the reading of a branch target address corresponding to the branch instruction is performed twice or more, and determination is performed as to whether the branch target addresses that have been read are identical. If the branch target addresses that have been read are identical, the branch instruction is executed, whereas if the branch target addresses that have been read are not identical, the anomaly detection processing is performed.

Specific examples of the rewriting method according to Embodiment 2 are described with reference to FIG. 6.

Figure 6:
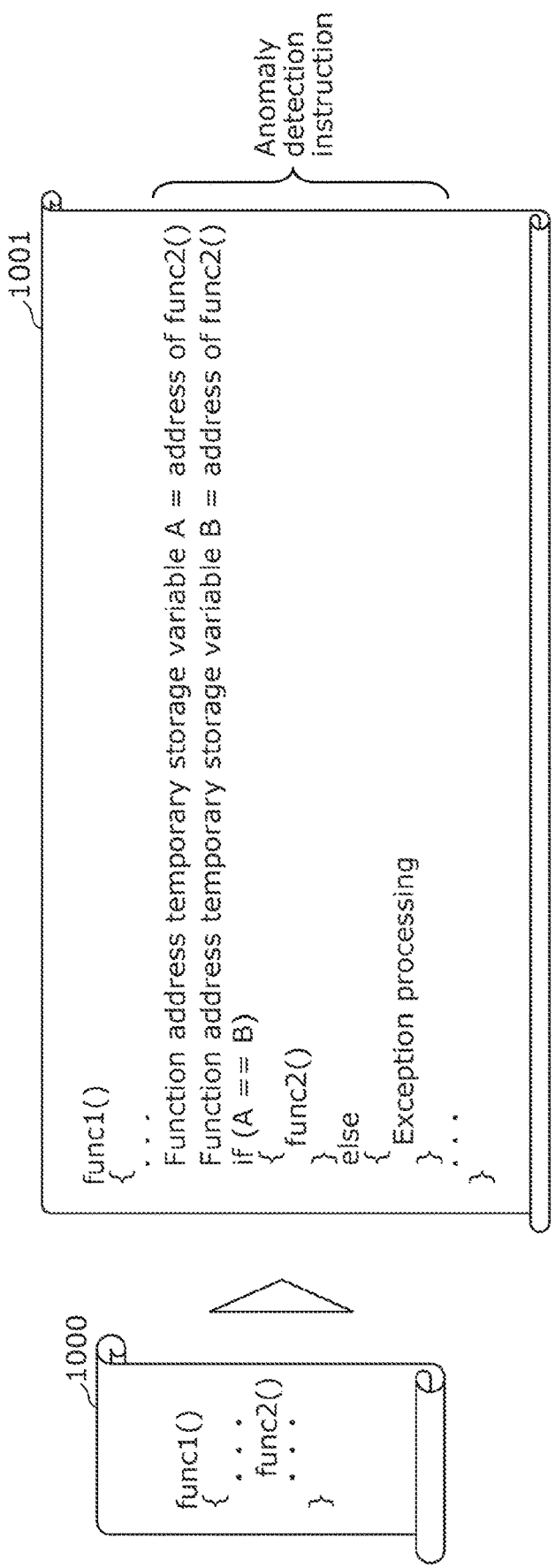
FIG. 6 schematically shows a specific example of the rewriting method according to Embodiment 2.

FIG. 6 schematically shows a specific example of the rewriting method according to Embodiment 2.

As shown in FIG. 6, the branch instruction (function func2( )) in program 1000 is detected, for example, to cause function func2( ) in program 1000 to be rewritten to the anomaly detection instruction. Accordingly, existing program 1000 can be rewritten to anomaly detection program 1001 by which an anomaly at the branch of a function can be detected. It should be noted that existing program 1000 may be rewritten to anomaly detection program 1002.

It should be noted that a program may contain a lot of branch instructions. If the rewriting processing is performed to all the branch instructions contained in the program, the processing load increases. In view of the situation, in the above rewriting method, when a specified condition is satisfied, the rewriting may be performed, whereas when the specified condition is not satisfied, the rewriting may not be performed. Examples of the specified condition include: when the branch instruction is rewritten to the anomaly detection instruction, an additionally-needed memory capacity, processing time, or the like is equal to or lower than a certain level. Furthermore, the branch instructions may be prioritized according to frequencies of the execution in the program. In addition, in the specific condition, the order of the priority of the branch instruction to be rewritten may be equal to or higher than a certain level. As described above, only when the specified condition is satisfied, the rewriting processing is performed, thereby preventing the processing load from increasing.

The present disclosure can be embodied as a rewriting device capable of rewriting an existing program to the anomaly detection program by which an anomaly at the branch of a function can be detected.

Figure 7:
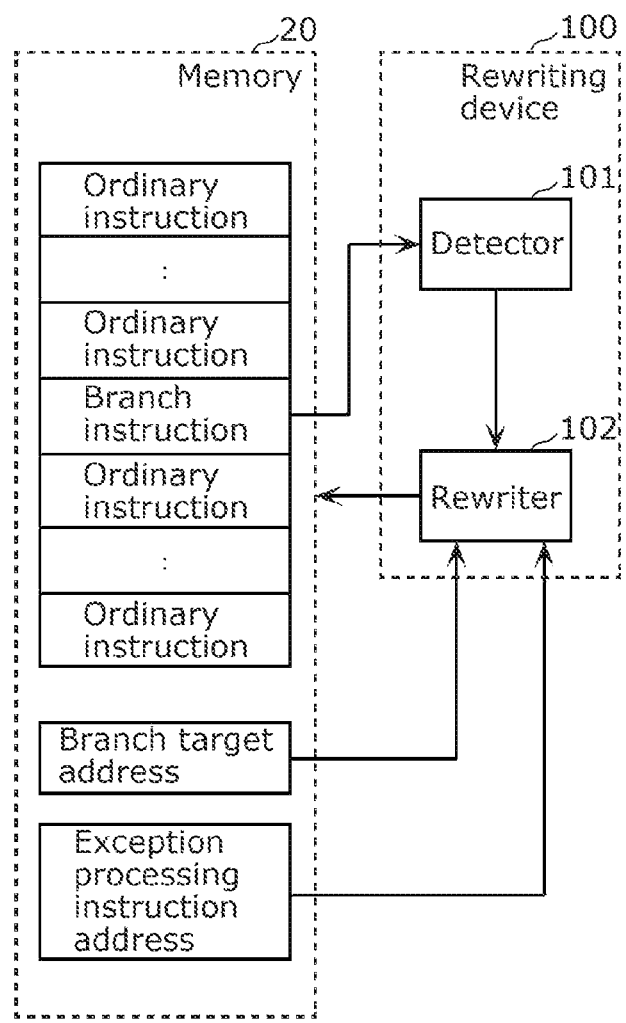
FIG. 7 is a block diagram showing an example of a rewriting device according to Embodiment 2.

FIG. 7 is a block diagram showing an example of rewriting device 100 according to Embodiment 2. FIG. 7 also shows memory 20, in addition to rewriting device 100. In memory 20, a program including branch instructions, addresses corresponding to various instructions, and so on are retained. The program including branch instructions, the addresses corresponding to various instructions may be retained in a single memory 20 or may be separately retained in a plurality of memories.

Rewriting device 100 is a computer including a processor, a memory, and so on. The memory can store a control program to be executed by the processor. Rewriting device 100 includes detector 101 and rewriter 102. Detector 101 and rewriter 102 are embodied by the processor or the like, which executes the control program stored in the memory.

Detector 101 detects a branch instruction in a program stored in memory 20.

Rewriter 102 rewrites the branch instruction detected by detector 101 to an anomaly detection instruction. For example, rewriter 102 performs the rewriting using a branch target address corresponding to the detected branch instruction, an address corresponding to the exception processing instruction, and so on.

If the specified condition described above is satisfied, detector 101 may detect the branch instruction in the program stored in memory 20, and rewriter 102 may rewrite the branch instruction that has been detected to the anomaly detection instruction.

The present disclosure can be embodied as rewriting device 100 (hardware) capable of rewriting an existing program to the anomaly detection program by which an anomaly at the branch of a function can be detected.

For example, steps in the rewriting method can be executed by a computer (a computer system). The present disclosure can also be embodied as a rewriting program for causing a computer to execute the steps included in the rewriting method. Furthermore, the present disclosure can be embodied as a non-transitory computer readable recording medium, such as a CD-ROM, which records the rewriting program.

The present disclosure may be embodied by the rewriting program (software), for example. In such a case, each of the steps included in the rewriting method is performed by executing the rewriting program using hardware resources including a CPU, a memory, an input-output circuit, and so on in a computer. In other words, the CPU obtains data from the memory or the input-output circuit to perform calculation, and outputs results of the calculation to the memory, the input-output circuit, or other units, thereby executing each of the steps.

Other Embodiments

As aforementioned, embodiments are described as examples of the technique according to the present disclosure. However, the technique according to the present disclosure is not limited to the embodiments, and can be applied to embodiments to which appropriate change, replacement, addition, omission, or the like is added. For example, variations as described below are included as the embodiments of the present disclosure.

Each of the structural components included in anomaly detection device 10 and rewriting device 100 according to the above embodiments may be embodied as a dedicated or a general-purpose circuit.

Each of the structural components included in anomaly detection device 10 and rewriting device 100 according to the above embodiments may be embodied as a large scale integration (LSI) that is an integrated circuit (IC).

The IC may not be embodied by the LSI, but may be embodied by a dedicated circuit or a general-purpose processor. A field programmable gate array (FPGA) that is programmable or a reconfigurable processor in which connection and setting of a circuit cell in the LSI are reconfigurable may be used.

If circuit integration technology that is substituted for the LSI is developed by development in a semiconductor technique or other derived techniques, such technology may be naturally used to perform the circuit integration on each of the components included in anomaly detection device 10 and rewriting device 100.

In addition, the present disclosure involves embodiments obtained by applying, to the embodiments, various variations that are conceivable by a person skilled in the art, embodiments embodied by any combination of structural components and functions in the respective embodiments within the scope of the present disclosure.

Further Information About Technical Background to this Application

The disclosures of the following patent applications including specification, drawings, and claims are incorporated herein by reference in their entirety: Japanese Patent Application No. 2020-058221 filed on Mar. 27, 2020, and PCT International Application No. PCT/JP2021/000423 filed on Jan. 8, 2021.

INDUSTRIAL APPLICABILITY

The present disclosure can be applied to a device and others which use a program containing a branch instruction.

The invention claimed is:
1. An anomaly detection method comprising:
reading a branch target address corresponding to a branch instruction, twice or more;
determining whether branch target addresses read are identical; and
executing the branch instruction when the branch target addresses read are identical, and executing anomaly detection processing when the branch target addresses read are not identical.

2. The anomaly detection method according to claim 1, wherein
the branch target addresses are retained in a single memory area, and
the reading includes reading the branch target addresses from the single memory area, twice or more.

3. The anomaly detection method according to claim 1, wherein
the branch target addresses are respectively retained in different memory areas, and
the reading includes reading the branch target addresses respectively from the different memory areas, twice or more.

4. The anomaly detection method according to claim 1, wherein
the reading is performed when a specified condition is satisfied, and the reading is not performed when the specified condition is not satisfied.

5. A non-transitory computer-readable recording medium having recorded thereon an anomaly detection program for causing a computer to execute the anomaly detection method according to claim 1.

6. An anomaly detection device comprising:
a detector that detects a branch instruction in a program;
a reader that reads a branch target address corresponding to the branch instruction, twice or more;
a determiner that determines whether branch target addresses read are identical; and
an executer that executes the branch instruction when the branch target addresses read are identical, and executes anomaly detection processing when the branch target addresses read are not identical.

7. A method of rewriting a program, comprising:
detecting a branch instruction in the program; and
rewriting the branch instruction detected into an anomaly detection instruction, wherein
the anomaly detection instruction includes instructions for:
reading a branch target address corresponding to the branch instruction, twice or more;
determining whether branch target addresses read are identical; and
executing the branch instruction when the branch target addresses read are identical, and executing anomaly detection processing when the branch target addresses read are not identical.

8. The method according to claim 7, wherein
the rewriting is performed when a specified condition is satisfied, and the rewriting is not performed when the specified condition is not satisfied.

9. A non-transitory computer-readable recording medium having recorded thereon a rewriting program for causing a computer to execute the method according to claim 7.

10. A device which rewrites a program, the device comprising:
a detector that detects a branch instruction in the program; and
a rewriter that rewrites the branch instruction detected into an anomaly detection instruction, wherein
the anomaly detection instruction includes instructions for:
reading a branch target address corresponding to the branch instruction, twice or more;
determining whether branch target addresses read are identical; and
executing the branch instruction when the branch target addresses read are identical, and executing anomaly detection processing when the branch target addresses read are not identical.

* * * * *